May 6, 1924.
W. H. B. PERRY
STONE SAWING MACHINE
Filed March 28, 1921
1,493,379
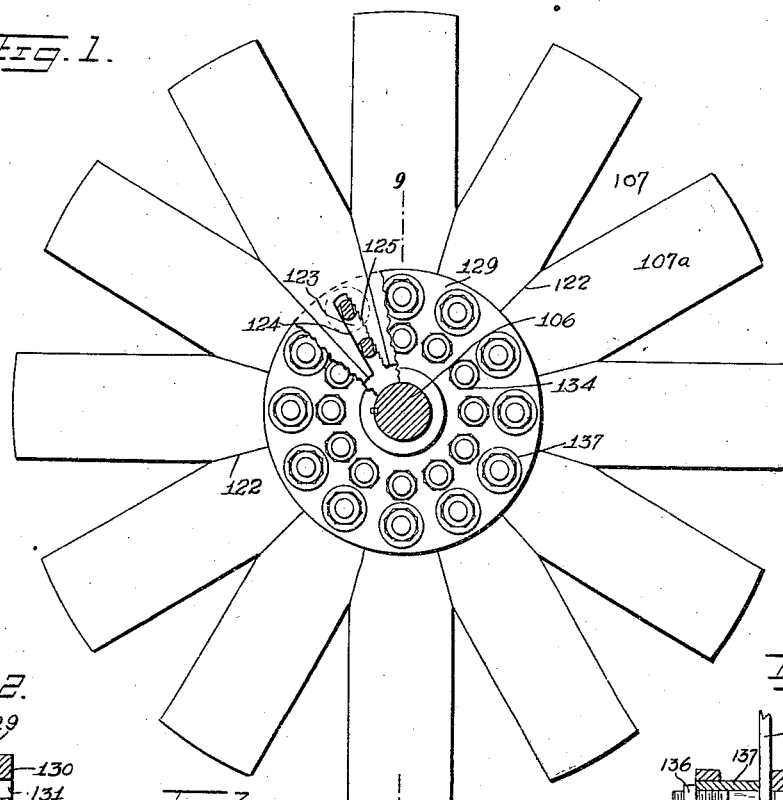
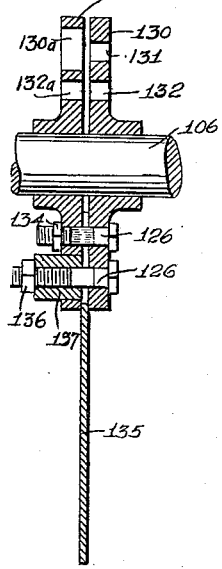
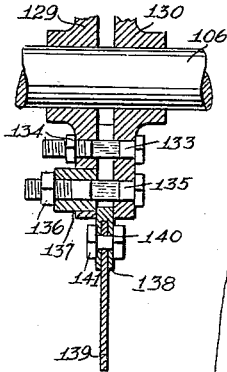
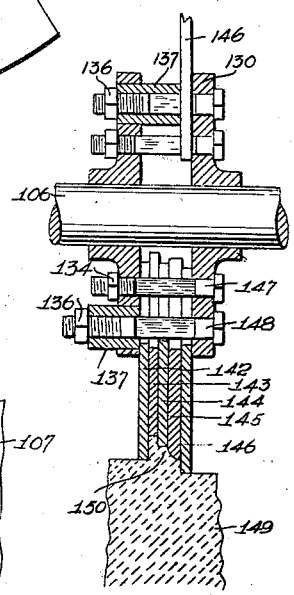
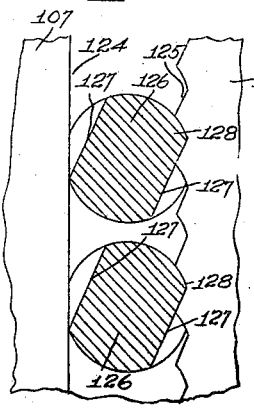
WITNESSES
H. T. Walker
Walton Harrison
INVENTOR
W. H. B. PERRY
BY Munn & Co
ATTORNEYS Patented May 6, 1924.

1,493,379

UNITED STATES PATENT OFFICE.

WILLIAM HENRY BENNETT PERRY, OF WATERBURY, VERMONT.

STONE-SAWING MACHINE.

Application filed March 28, 1921. Serial No. 456,153.

*To all whom it may concern:*

Be it known that I, WILLIAM HENRY BENNETT PERRY, a citizen of the United States, and a resident of Waterbury, in the county of Washington and State of Vermont, have invented a new and Improved Stone-Sawing Machine, of which the following is a full, clear, and exact description.

My invention relates to stone sawing machines, and my more particular purpose being to produce a circular cutting member known in this art as a "saw" and having a composite, to be used for cutting granite, marble, stone, or other material, and preferably employed in connection with a loose material, such as chilled shot, powdered abrasive or sand.

More particularly stated, my invention relates to the construction of the saw and to the means for rendering various parts thereof removable and interchangeable, as well as to improve the efficiency of the several parts.

Reference is made to the accompanying drawings forming a part of this specification and in which like reference characters indicate like parts throughout all of the figures.

Figure 1 is a side view partly in elevation and partly in section of the saw and the parts used for supporting the same.

Figure 2 is a section on the line 9—9 of Figure 1.

Figure 3 is a section somewhat similar to Figure 2, for showing a different kind of saw tooth.

Figure 4 is a section somewhat like Figure 2, for showing a number of saw teeth used together as a group, for the purpose of conferring a special shape upon stone or other material to be operated upon by the saw.

Figure 5 is a detail showing in section a pair of bolts used for holding saw teeth in position.

The saw may assume slightly different forms, as may be understood from Figures 1 to 5 inclusive. The teeth of the saw are shown at 107$^a$ and may be made of hardened steel or of various abrasive materials, such as carborundum, emery or other gritty substances having sufficient strength and hardness for the purpose. The saw teeth are provided with beveled faces 122 and each tooth is provided with a slot 123, bounded on one side by a smooth surface 124 and on the other side by a dentated surface 125, as shown more particularly in Figure 5. In order to hold the saw teeth in position, I provide special bolts 126 of the form shown more particularly in Figure 5. Each bolt is provided with shallow slots 127 and is of such form that a portion 128 of the bolt just fits into one of the indentations of the surface 125. The saw plate is made in two parts 129, 130, as may be understood from Figures 2, 3, 4. The part 130 is provided with bolt holes 131, 132. The part 129 is provided with bolt holes 132$^a$ mating the holes 132, and is also provided with larger holes 130$^a$ to be brought in axial registry with the holes 130. The holes 131, 132, 132$^a$ are of the same size, and are adapted to be fitted directly by the bolts 126. I also provide bushings 137, one for each of the holes 138$^a$ and of such size and so proportioned as to fit neatly into the same. These bushings 137 are each of cylindrical form and adapted to be fitted by some one of the bolts 126, so that these bolts may extend through the bushings as shown. Each collar or bushing 137 holds an individual saw tooth. By this arrangement, any one or more of the saw teeth may be adjusted without disturbing the other saw teeth.

With my arrangement of the saw teeth, the saw can be run in either of two directions.

The saw teeth 107$^a$ are removable independently of each other. For this purpose, the beveled faces 122 are useful, as may be understood from Figure 1. In order to remove one of the saw teeth, the nuts 134, 136 are loosened, and the bolts 126 turned slightly in a contra-clockwise direction according to Figure 5, so that the bolts 126 are disengaged from the adjacent edges of the slot 123. This done, the saw tooth can be removed by merely pulling it out radially. Thus, any single one or any desired number of the saw teeth may be removed and replaced independently of the other teeth.

In some instances, as shown in Figure 2, the saw tooth may be thin, as indicated at 135, and made of steel. In other instances, I provide the arrangement shown in Figure 3. The two parts 129, 130 constituting the saw plate are here spaced a little further apart than is the case in Figure 2, and bolts 133, 135 a little longer than the bolts 126 are used. Clamped between the two parts of the saw plate is a tooth mounting 138 carrying a tooth 139, which is fitted into it and held in position by a bolt 140 provided with a nut 141. The tooth is removable from the mounting 138, and this mounting is of course removable relatively to the saw plate.

In other instances, I use the arrangement illustrated in Figure 4. The two parts 129, 130 of the saw plate are moved still further apart and bolts 147, 148 of still greater length are thrust through them and secured by nuts 134, 136, the bushing 137 being preferably used, as before. Several separate teeth 142, 143, 144, 145, 146 are grouped together, and held in position by the bolts 147, 148. These teeth may be of the same thickness or of different thicknesses, and are severally of such form that when grouped together they may cut the stone shown at 149, in such manner as to leave a portion 150 of arbitrary conformity.

This arrangement may be of peculiar service for the purpose of enabling stone to be so cut as to leave portions thereof in relief—or, in other words, to leave so-called raised portions.

The various saw teeth used for different purposes may assume a considerable variety of forms and may be made of materials considerably different in character. The precise form of teeth and the exact use for which the same is to be employed is a matter controllable in great measure by the exigencies of the particular case.

I, therefore, do not limit myself to any particular shape or form for the saw teeth or to any special material of which the same are to be constructed except as defined in my claims.

Having thus described my invention, what I claim as new and desire to secure by Letters Patent is as follows:

1. A device of the character described comprising a saw plate made in halves and provided with bolt holes, saw teeth each provided with a portion extending between said saw plates having a slot and bolts extending through said bolt holes and through said slot.

2. A device of the character described comprising a saw plate made in two parts provided with bolt holes, a saw tooth provided with a portion extending between said two parts and having a slot, bolts extending through said bolt holes and through said slots and a bushing fitted upon one of said bolts and engaging one of said two parts.

3. A device of the character described comprising a saw plate made in two parts provided with bolt holes, a saw tooth provided with a slot and with a portion for extending between said two parts, said slot being bounded on one side by a smooth surface and bounded upon its opposite side by a dentated surface and bolts extending through said bolt holes and through said slots, said bolts each being provided with a portion for extending into said indented surface in order to hold the saw tooth in position.

4. A device of the character described including a saw plate consisting of opposed portions, securing means extending between said portions, and a plurality of saw teeth separate from each other and abutted together face to face so as to form virtually a single saw tooth of composite form, said teeth having registering longitudinal slots for receiving said securing means whereby each tooth may be adjusted radially with respect to the saw plate and independent of the other teeth.

4. A device of the character described including a saw plate consisting of opposed portions, a plurality of teeth interposed between said portions and each provided with a longitudinal slot and disposed radially with respect to said plate, and securing means extending through the portions of said plate and the slots in said teeth to secure the latter in position and permit of radial adjustment thereof relative to said plate.

6. A device of the character described including a saw plate consisting of opposed portions, a plurality of teeth interposed between said portions and each provided with a longitudinal slot, one edge of each slot being straight and the opposed edge having angularly disposed portions, and securing means engaging the straight and angularly disposed edges of each slot for securing the respective tooth in position.

WILLIAM HENRY BENNETT PERRY.